Patented Nov. 28, 1950

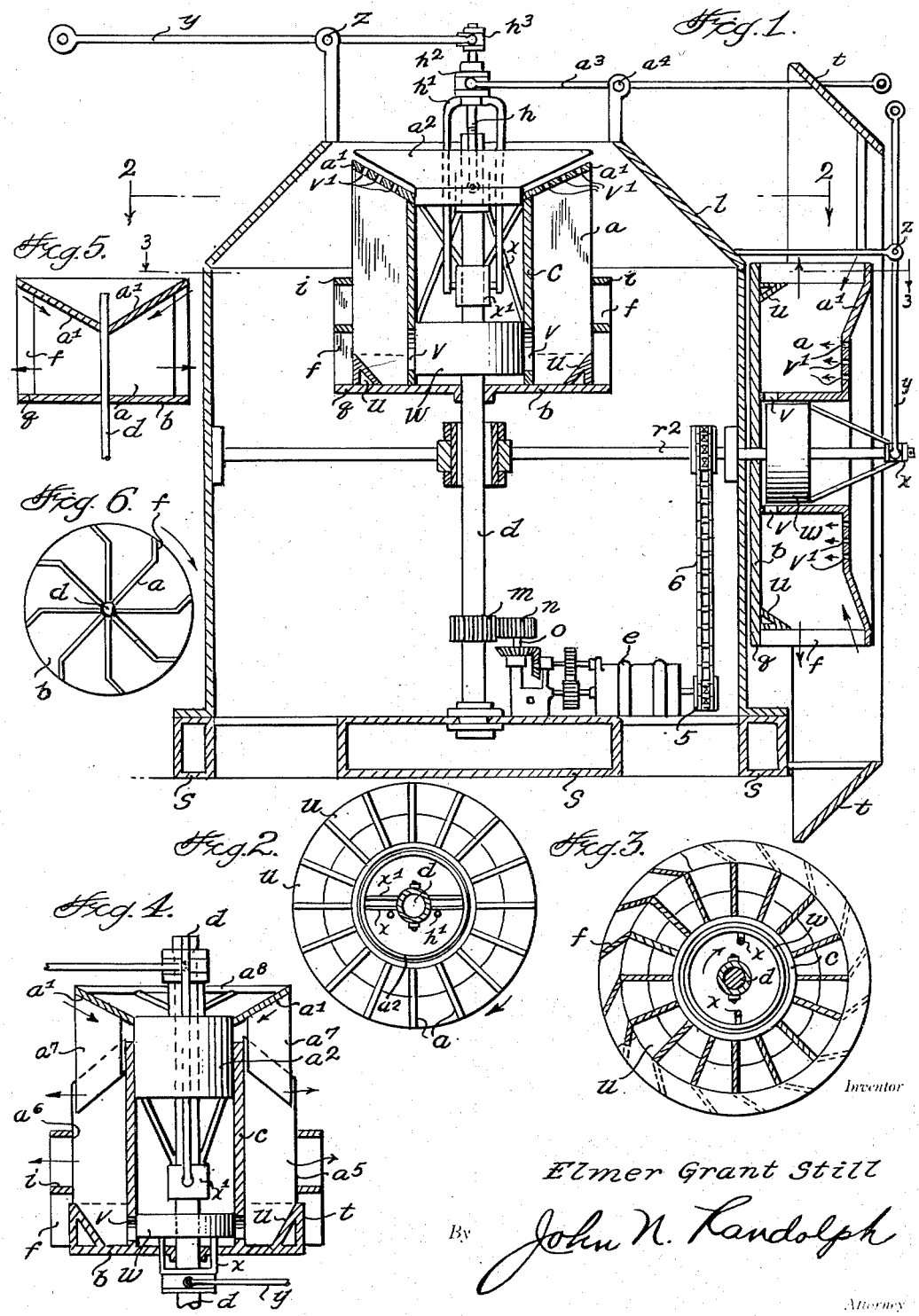

2,531,748

UNITED STATES PATENT OFFICE 2,531,748

FLUID PROPULSION MEANS FOR AIRCRAFT

Elmer Grant Still, Livermore, Calif.

Application August 13, 1948, Serial No. 44,180

3 Claims. (Cl. 244—23)

My invention relates to improvements in aviation devices in which rotating radial vanes are used for the purpose of creating a partial vacuum on a surface by virtue of centrifugal force. It is simply an improvement on the aircraft device set forth in my Patent Number Re. 17,868, dated November 11, 1930, and in the vacuum lift device of Wilmer W. Clark's Patent Number 2,138,999, dated December 6, 1938.

The objects of my present invention are: to provide a simple, efficient and comparatively small and light-weight device for lifting and propelling aircraft; to attain bird efficiency in flight (scientists having found by experiment that many birds lift at the rate of between 100 and 200 pounds per horse-power used, while airplanes lift only about 20 and helicopters about 12 to 15 pounds per horse-power); to produce a "still flyer," or device that will stand still while flying, or hover in the air, and arise and alight perpendicularly; to provide a propelling and lifting device that (unlike the screw propeller) will be as efficient at high as at low speeds of revolution and that will have at least as much lifting power per horse-power when hovering as when moving forward (relative to the air); to provide an efficient lifting and propelling device having no regularly working parts to wear out and get out of order; to make aircraft practically self-balancing; to reduce the dangers of flying to a minimum, and other objects hereinafter mentioned.

I attain these objects by the mechanism illustrated in the accompanying drawings, in which—

Fig. 1 is a view, in central vertical section, of one form of the device; Fig. 2, a plan view of the top of the principal revolving part of the device on the line 2—2 and minus the hollow frustrum; Fig. 3, a cross section of the lower half of the principal revolving part of the device on a level with the line 3—3; Fig. 4, a view, in central vertical section, of another form of the device; Fig. 5, a central sectional view of a simpler form of the device; Fig. 6, a cross section of the same on the same level as the lower arrows.

Similar letters and numbers refer to similar parts throughout the several views.

In the preferred form of the device, the improvement over previous devices attempting to use this principle of centrifugal force to create a thrust-giving partial vacuum on a surface by means of rotating radial vanes, consists in much less air being taken into and discharged from the device; also, in a higher degree of partial vacuum being created on the inside of the base, as compared with the slight partial vacuum or none at all forming on the inside of the cover, at the opposite end of the device from the base, with the result that greater lift or thrust is secured from a given amount of power used; also, in the centrifugal force being used to reduce the amount of air intake, doing this automatically; also, in means being provided for increasing or decreasing, or adding or abolishing, the other source of air intake.

In order to accomplish the objects of my invention, I make use of centrifugal force, by means of thin radial vanes $a$, preferably (though not necessarily) taller than wide, which (when used for lifting) are mounted vertically on a horizontal disc $b$, the union being air-tight; and a vertical cylinder $c$ may be mounted air-tightly and centrally on said disc, with the vanes attached to the cylinder; or the vanes may, instead, extend clear to the central axle $d$ and be attached to it, as shown in Fig. 5; while a cover, or roof, is attached to the top ends of these vanes $a$ and would preferably slope upward and outward; and minute holes $v1$ extending through this roof $a1$ could be provided to permit only enough outside air to thus enter the device from the top to annul partly or entirely the partial vacuum tending to form just under said roof.

The rapid revolution of the disc $b$, with its mountings, on its central vertical axle $d$ (to which it is attached) by the engine $e$ (through its drive shaft $o$, on which is fastened the gear $n$, meshing with the gear $m$ on the axis $d$) causes the air to enter the openings at the outer edges of the vanes $a$ near their tops and also to enter through the minute holes extending through the roof, or cover, $a1$, except that these holes may be closed at will by moving downward the combined frustrum and cylinder $a2$; the cylinder part fitting within the upper part of the central cylinder $c$ (Figs. 1 and 2) and having a framework $x1$ attached to it, extending downward and fitting around the central shaft $d$ as a sleeve; while a lever $a3$, pivoted at $a4$, is connected with said framework by means of the double rods $h1$ and their attached collar $h2$, for operating said combined cylinder and frustrum $a2$ up and down as desired during the operation of the device and thus opening or closing the minute holes $v1$ extending through the roof, or cover, $a1$.

The result of this rapid revolution of the device on its axis is that the air thus entering the device at or near its top is thrown out by centrifugal force at the lower part of the vanes before much of it can reach the top side of the disc $b$, where a lift-giving partial vacuum is thus formed; and for this purpose the vanes are preferably made wider toward the base, or disc, b, so as to exert more centrifugal force there; while the lesser vane-width near the top of the vanes permits the air to enter there centripetally, but the centrifugal force exerted there is sufficient to slow down the air-intake, so that the device handles considerably less air than would be the case if the vanes were open at or near their tops, as in previous forms of such devices. For this purpose, also, the roof, or cover, a1 preferably slopes upward (in the device as used for lifting), so that the attached vanes are narrower toward the top and thus give less centrifugal force to the air handled. The best angle for this upturned cover would be determined, of course, by experiment and should be smaller, evidently, if the minute holes admitting air through the cover are also used. This angle might also be different for forms of the device revolving at high or low speed.

Another factor on which the most advantageous angle for the roof, or cover, a1 would partly depend would be the comparative difference between the amount of vane surface engaged in throwing the air outward and the amount permitting the air to come in centripetally. This would preferably be arranged so that the air would flow inward at the top of the vanes and outward toward the bottom of them. However, the device might still operate—although less efficiently—if these directions were reversed. In the drawings, the arrows indicate air inflow at the top and outflow near the bottom, in accordance with the vane areas and their distances from center.

The object is to produce as high a degree of partial vacuum on the top side of the base, or disc, b as possible, in contrast with as little partial vacuum as possible—or even none at all—on the under side of the roof, or cover, a1; and the difference between these two values would, of course, determine the lifting ability of the device. It is estimated that this difference might amount to $\tfrac{1}{10}$ of a partial vacuum in this improved form of the device; but if even $\tfrac{1}{20}$ of a partial vacuum (difference) were attained, the resulting lift for a disc 4 feet in diameter would be $\tfrac{1}{20}$ of 14.7 pounds (the air pressure per square inch at sea level) times 144 (the number of square inches in a square foot) times 12.5664 (the number of square feet in a 4-foot disc), which gives 1,330.02 pounds lift; while a 3-foot disc would yield 748.13 pounds lift.

A concurrent object is to admit air into the device only for the purpose of annulling—partly or entirely—the partial vacuum tending to form on the underside of the cover a1, and hence admitting it only at the locations and in the smallest amount that will answer this purpose.

These radial vanes a would be made numerous enough to give the air between them sufficient rotary and centrifugal motion and to add sufficient strength and rigidity to the device, in conjunction with the cover a1.

It is a well-known fact that experiments made by M. Eiffel and others have proven that fully two-thirds of the lift of an airplane is due to the air-rarefaction, or negative air-pressure, or partial vacuum, formed on the upper side of the planes; and this invention (as used for lifting) aims to devote the engine power to producing such a lift-giving partial vacuum by means of a small, strong, light-weight device instead of using a large, fragile, heavy airplane for the purpose.

Scientific tests in recent years have shown that centrifugal force increases directly with the speed of revolution, weight and distance from center (radius) of the revolving body or particles—instead of increasing with the square of the speed of revolution when these other two factors remain the same, as has been previously supposed. In contrast to this, the lift or thrust of a screw propeller increases only about 50 per cent when the speed (or power applied) is doubled. Hence a centrifugal flyer, such as this invention, must prove much more efficient at higher speeds and—contrariwise to airplanes and helicopters—should yield more lift when hovering than when moving forward in the air, since in hovering all the power would be devoted to lifting and since a centrifugal flyer does not depend on its forward motion for any of its lift, while an airplane depends wholly on such motion for lift and a helicopter partly.

The fact that nature's flying creatures are so much more efficient than any flying machine so far made by man would indicate that some mechanical method of attaining aviation efficiency has so far been overlooked. For instance, if a wild goose were no more efficient than an airplane it would need to be able to exert nearly half a horse-power ($\tfrac{9}{20}$) in order to lift its nine pounds weight; whereas it has only about $\tfrac{1}{40}$ of a horse-power in its wing muscles, according to experiments made by scientists. (See "Vehicles of the Air," by Victor Lougheed, page 162.) The common pigeon lifts 83 pounds per horse-power, they found, and the humming bird only 15; but its wing muscles are extra strong for its 6,000-mile migration flights without alighting. Since man can use mechanical means that birds can not, he should be able to attain even more efficiency in flight, as he has done with the bicycle on roads.

When used on aircraft for the purpose of forward propulsion, this device would, of course, have a horizontal position, as shown at the right-hand side of Fig. 1, instead of being in a vertical position as shown elsewhere in the drawings.

The engine e would preferably be a steam engine, so that engine failure would be practically impossible; and, owing to the greater lift per horse-power secured (probably several times as much) and the lighter weight of the device, it would be feasible to use heavier (and therefore stronger and more reliable) engines than those now used in aviation, or even two or more sets of power plants for emergency use in case any one fails.

To aid in maintaining the partial vacuum referred to, baffle plates ff are attached air-tightly to the outer edges of the lower half or more of each vertical vane; these baffle plates extending vertically, preferably from an extension q of the disc b, and at a considerable angle to said vanes a and being preferably strengthened by circular rims, such as ii. These baffle plates assist in throwing out the air and beat back the air that tends to rush inwardly (centripetally) to fill the partial vacuum forming on the inside of the disc b.

A hollow frustrum of a cone l, having an angle of about 45 degrees, is shown arranged around the upper part of the revolving device, with vertical sides r below it, so as to throw the air currents downward as they strike it after being thrown outward by centrifugal force. This frustrum would thus aid in securing further lift—and, in the case of a device of this kind arranged horizontally, as shown at the right-hand side of Fig. 1, securing more thrust, or push—and together with the vertical walls r would also prevent outside air currents (relative to the device) from interfering with the equilibrium of the device.

The outer part of the disc b may be provided with a circular, vertical strip t, or with a circular strip u sloping outward and upward (preferably at a steep angle), mounted air-tightly on said disc, or with both such strips combined into one as shown, or with several of them spaced a distance apart. These would be a still further aid in maintaining the partial vacuum while the device is in action, by keeping the air from coming in at the bottom edge (centripetally) and by the sloping part u tending to throw upward and outward what little air does find its way to the bottom of the vanes.

Small holes v (Figs. 1 and 4), preferably vertical slots uniform for each vanes compartment, may be provided, preferably extending through the walls of the central cylinder c near the bottom thereof, together with a smaller cylinder w fitting air-tightly inside of the larger cylinder c, so that, by moving said inner cylinder upward, downward or around, the said slots will be partly or wholly uncovered, permitting outside air to rush into said compartments near the bottom during the operation of the device and thus do away with the partial vacuum there to a greater or less extent, as desired, without decreasing the speed of revolution; the hollow cylinders c and w each being at least partly open at top or bottom or both. A framework x (Figs. 1, 2 and 3) extends upward from said inner cylinder w and around the driving shaft d as a sleeve sliding on it, and a lever y, pivoted at z, is connected with said framework by means of the double rod h (which becomes a single rod just above the central axle d) and its attached collar h3, for operating said inner cylinder w up and down and thus varying the lifting force of the device as desired. This would be useful in enabling the device to rest on the ground with the engine running at full power, also to suddenly rise or drop in the air, to be suddenly checked in its downward movement, as in landing, and to land as gently as desired, all without changing the engine throttle.

As shown in Fig. 4, the hollow frustrum, or roof, a1 may be attached to short radiating vanes a7 and to a framework a8, slidably mounted on the shaft d near its top, with these short vanes a7 overlapping the vanes a, so that by sliding this framework and attached parts up and down on the shaft the distance between the roof a1 and the disc b and hence the effective height of the vanes may be varied during the revolution of the device and hence the amount of air intake varied accordingly. This would be especially useful for experimental purposes, in order to determine the most efficient relative dimensions for the device.

This whole aviation device would preferably be built strongly of metal, such as welded sheet steel or duralumin. It is shown mounted on floats s. By reason by the weight being mostly below the plane of lift, as shown, and outside air currents being prevented by the surrounding wall from interfering with the equilibrium of the device, as above explained, the device would be practically self-balancing, although means for lateral and longitudinal balancing could easily be added if desired. Preferably, small reversible-bladed propellers would be used for balancing and also for steering. Then, with a reliable steam engine, as above mentioned, it would make flying quite safe.

This device could be attached, as a part, to an airplane, dirigible, helicopter or other aircraft, either for lifting or propelling; or it could be used alone or like a captive balloon; and several of these devices, revolving preferably in opposite directions, or in balanced (symmetrical) relation (whether side by side or one above another), could be used on the same aircraft.

I do not restrict my invention to the preferred forms nor the precise form or relative dimensions herein given, for it is plain that variations (such as having the vanes not exactly perpendicular to the base, or the vanes being somewhat curved or not being exactly radial but at an angle thereto, or the base or cover not being exactly a disc but a polygon, or the base not being exactly flat but sloping or curving instead, or the cover being curved instead of sloping straight) could be made from the drawings or specifications herein given without departing from the principle of the invention; a disc being "any plate or surface that is flat and circular or approximately so," as defined in the New Standard Dictionary.

Including such modifications and equivalents, I therefore claim:

1. In an aviation device for lifting or propelling, a disc, a rotary driven shaft disposed perpendicular to the plane of said disc extending centrally therethrough and secured thereto, a plurality of vanes having corresponding ends secured to one side of the disc and extending perpendicular therefrom, said vanes being disposed around the shaft and radially thereof and having opposite ends disposed remote to the disc and which extend radially outward from the shaft and away from the plane of the disc, and an annular cover disposed concentrically of the shaft and flared radially outwardly and away from the disc, the surface of the cover facing said disc being secured to the last mentioned end of each vane and extending from the inner edge to the outer edge of each vane.

2. An aviation device as in claim 1, said cover being perforated for admitting air to the spaces between the vanes and adjacent to said cover to eliminate any partial vacuum formed in the spaces between the vanes and adjacent the cover.

3. An aviation device as in claim 1, said cover being perforated for admitting air to the spaces between the vanes and adjacent to said cover to eliminate any partial vacuum formed in the spaces between the vanes and adjacent the cover, and a closure reciprocally supported on the shaft having a frusto-conical surface movable into and out of engagement with the opposing dished surface of the cover for closing and exposing, respectively, said perforations during operation of the device.

ELMER GRANT STILL.

REFERENCES CITED

The following references are of record in the file of this patent:

UNITED STATES PATENTS

| Number | Name | Date |
|---|---|---|
| Re. 17,868 | Still | Nov. 11, 1930 |
| 1,585,281 | Craddock | May 18, 1926 |
| 2,138,999 | Clark | Dec. 6, 1938 |